(12) United States Patent
Wang et al.

(10) Patent No.: US 10,552,153 B2
(45) Date of Patent: Feb. 4, 2020

(54) EFFICIENT RANGE-BASED MEMORY WRITEBACK TO IMPROVE HOST TO DEVICE COMMUNICATION FOR OPTIMAL POWER AND PERFORMANCE

(71) Applicant: Intel Corporation, Santa Clara, CA (US)

(72) Inventors: Ren Wang, Portland, OR (US);
Chunhui Zhang, Portland, OR (US);
Qixiong J. Bian, Beaverton, OR (US);
Bret L. Toll, Hillsboro, OR (US);
Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 15/476,302

(22) Filed: Mar. 31, 2017

(65) Prior Publication Data
US 2018/0285105 A1 Oct. 4, 2018

(51) Int. Cl.
*G06F 9/30* (2018.01)
*G06F 12/0842* (2016.01)
(Continued)

(52) U.S. Cl.
CPC .......... *G06F 9/3004* (2013.01); *G06F 9/3016* (2013.01); *G06F 12/0842* (2013.01); *G06F 12/0875* (2013.01); *G06F 12/0891* (2013.01); *G06F 13/28* (2013.01); *G06F 12/084* (2013.01); *G06F 2212/452* (2013.01); *G06F 2212/62* (2013.01)

(58) Field of Classification Search
CPC .. G06F 9/3004; G06F 9/30047; G06F 12/084; G06F 12/0891
See application file for complete search history.

(56) References Cited

U.S. PATENT DOCUMENTS 6,321,299 B1 * 11/2001 Chauvel .............. G06F 12/0804
711/135
6,665,767 B1 * 12/2003 Comisky ............. G06F 12/0804
711/143

(Continued)

OTHER PUBLICATIONS

ARM1176JZ-S Technical Reference Manual; revision r0p7, selected pages. Downloaded from http://infocenter.arm.com/help/topic/com.arm.doc.ddi0333h/Babhejba.html on Dec. 29, 2018. (Year: 2009).*

*Primary Examiner* — Michael J Metzger
(74) *Attorney, Agent, or Firm* — Nicholson De Vos Webster & Elliott LLP

(57) ABSTRACT

Method and apparatus for efficient range-based memory write back is described herein. One embodiment of an apparatus includes a system memory, a plurality of hardware processor cores each of which includes a first cache, a decoder circuitry to decode an instruction having fields for a first memory address and a range indicator, and an execution circuitry to execute the decoded instruction. Together, the first memory address and the range indicator define a contiguous region in the system memory that includes one or more cache lines. An execution of the decoded instruction causes any instances of the one or more cache lines in the first cache to be invalidated. Additionally, any invalidated instances of the one or more cache lines that are dirty are to be stored to system memory.

16 Claims, 16 Drawing Sheets

(51) Int. Cl.
*G06F 12/0875* (2016.01)
*G06F 12/0891* (2016.01)
*G06F 13/28* (2006.01)
*G06F 12/084* (2016.01)

(56) References Cited

U.S. PATENT DOCUMENTS

| | | | | |
|---|---|---|---|---|
| 6,728,828 B2* | 4/2004 | Hashimoto | ............ | G09G 5/391 |
| | | | | 365/189.05 |
| 6,772,326 B2* | 8/2004 | Chauvel | ................ | G06F 9/3004 |
| | | | | 711/125 |
| 6,978,357 B1* | 12/2005 | Hacking | ............ | G06F 12/0804 |
| | | | | 711/133 |
| 7,000,081 B2* | 2/2006 | Hooker | ................ | G06F 9/3004 |
| | | | | 711/135 |
| 7,194,587 B2* | 3/2007 | McCalpin | ........... | G06F 9/30047 |
| | | | | 711/133 |
| 8,214,598 B2* | 7/2012 | Dixon | ................ | G06F 12/0891 |
| | | | | 711/135 |
| 2012/0198164 A1* | 8/2012 | Damodaran | ....... | H03K 19/0016 |
| | | | | 711/122 |

* cited by examiner

US 10,552,153 B2

EFFICIENT RANGE-BASED MEMORY WRITEBACK TO IMPROVE HOST TO DEVICE COMMUNICATION FOR OPTIMAL POWER AND PERFORMANCE

BACKGROUND

Field of the Invention

This invention relates generally to the field of computer processors. More particularly, the invention relates to a method and apparatus for range-based memory writeback.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. A given instruction is expressed using a given instruction format (and, if defined, in a given one of the instruction templates of that instruction format) and specifies the operation and the operands. An instruction stream is a specific sequence of instructions, where each instruction in the sequence is an occurrence of an instruction in an instruction format (and, if defined, a given one of the instruction templates of that instruction format).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of method and apparatus for efficient range-based memory writeback is described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Many usages of modern computers require host to device communication through direct memory access (DMA), a mechanism that allows peripheral components in a computer system to transfer their I/O data directly to and from system memory without the need to involve the system processor. For example, network interface cards (NICs) and graphic processing units (GPUs) can retrieve data packets and blocks directly from the host memory to carry out their respective functions, thereby bypassing the system processor and speeding up memory operations. Thus, the DMA mechanism can greatly increase throughput to and from a device. However, if the DMA controller, which controls the DMA process, does not participate in the host processor's cache coherency, as is often the case, the operating system (OS) and/or software running on the OS will need to ensure that cache lines presently stored in the processor cache are flushed (i.e., stored) to the system memory before an outgoing DMA transfer is started (i.e., a read from system memory). Similarly, cache lines in the processor cache need to be invalidated before a memory range affected by an incoming DMA transfer is accessed (i.e., write to system memory). In addition, the OS or software must also make sure that the affected memory range is not accessed by any running threads to prevent conflicts in memory coherency.

Figure 1A:
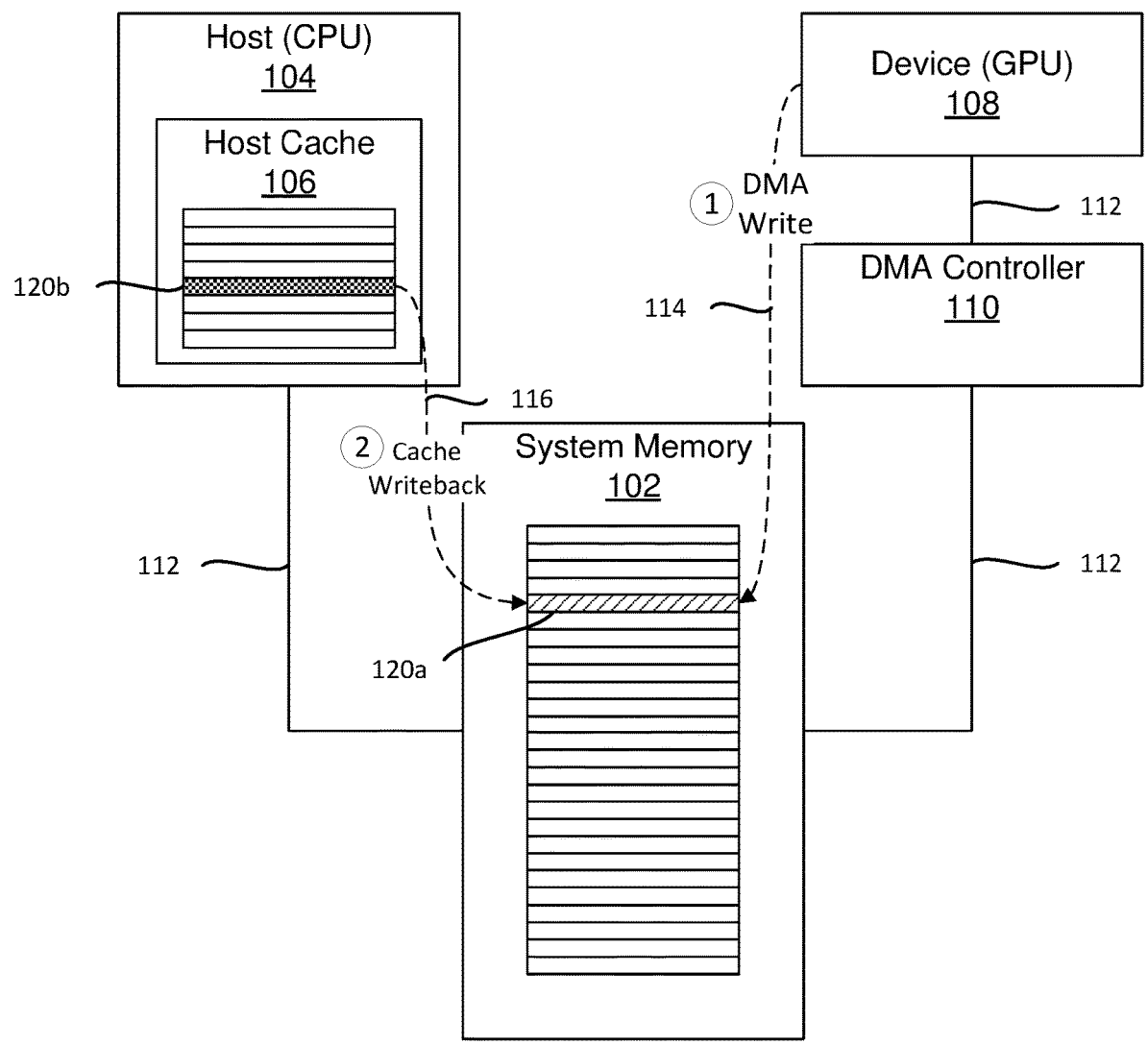
FIG. 1A-1B illustrate the potential coherency issues between host and device when DMA mechanism is utilized.
Figure 1B:
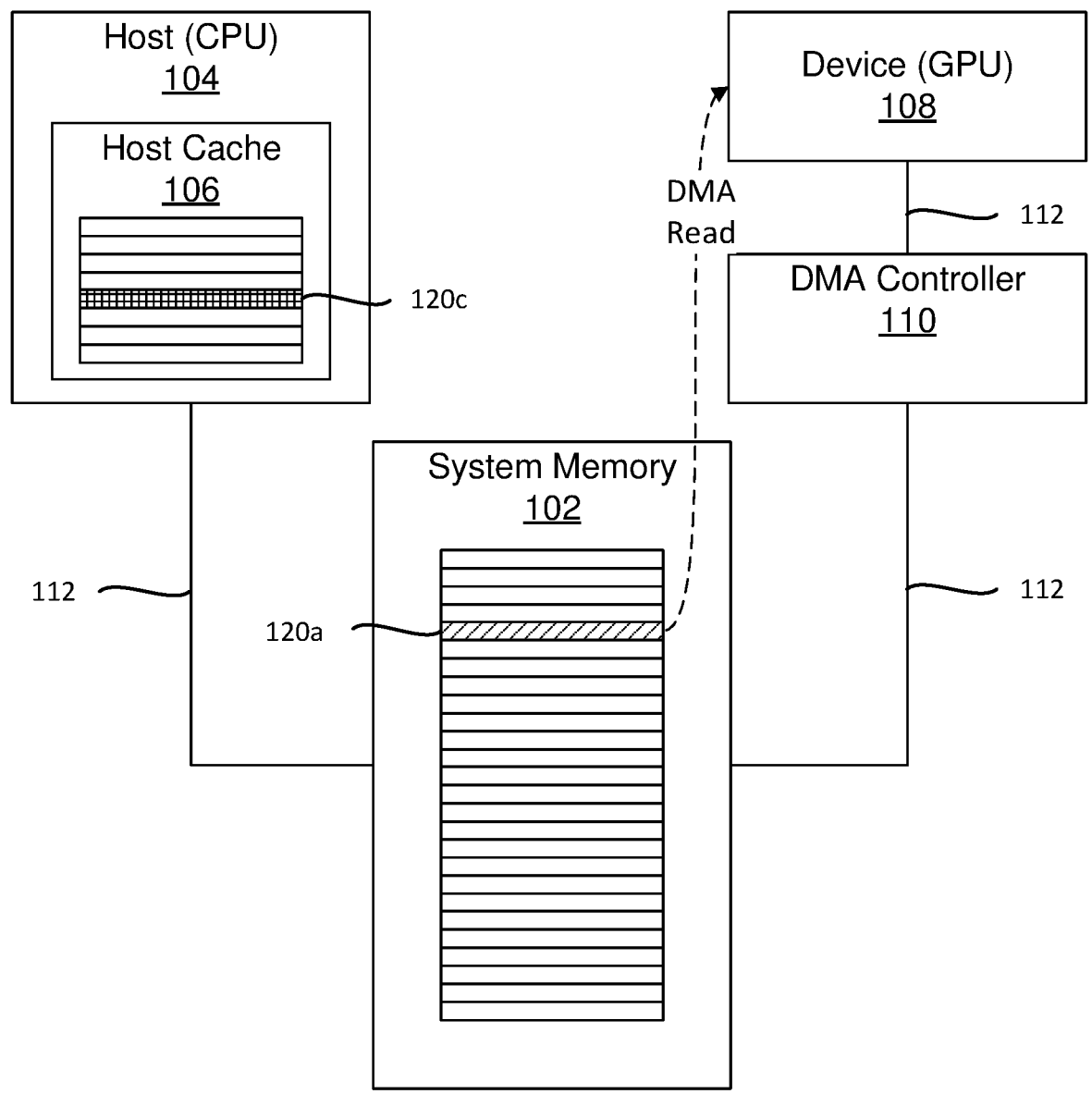

FIG. 1A-1B illustrate the potential coherency issues between host and device when DMA mechanism is utilized. A device initiates an asynchronous DMA read or write operation to access data directly to and from system memory instead of through the host cache. However, for a DMA write operation, unless the host cache has been flushed just before the DMA write, the data transferred into system memory by the DMA operation could be overwritten with stale data that was cached by the host in the host cache. For example, in FIG. 1A, a device (i.e., graphics processing unit (GPU)) 108 directly accesses data in the system memory 102 through a DMA controller 110 without going through the host (i.e., central processing unit (CPU)) 104. For simplicity, the host, device, DMA controller, and system memory are shown to be interconnected by bus 112. During a DMA write 114, the GPU 108 writes data to cache line 120*a* in the system memory 102 through the DMA controller 110. Subsequent to the DMA write 114, the host 104, either through eviction or a writeback operation, writes cache line 120*b* into the system memory 102 overwriting cache line 120*a*. This creates a coherency issue as cache line 120*b* may not the most current copy of cache line 120 and the data in cache line 120*a* is lost.

Similarly, unless the host cache has been flushed to the system memory just before a DMA read operation, the data in the host cache may be more up-to-date than the copy in system memory. For example, in FIG. 1B, the host cache 106 of the host 104 contains a modified copy of the cache line 120*c* that has yet to be stored to the system memory. If the device initiates a DMA read for that cache line in system memory, the device will receive an unmodified cache line 120*a* instead of the modified version 120*c*.

Figure 2:
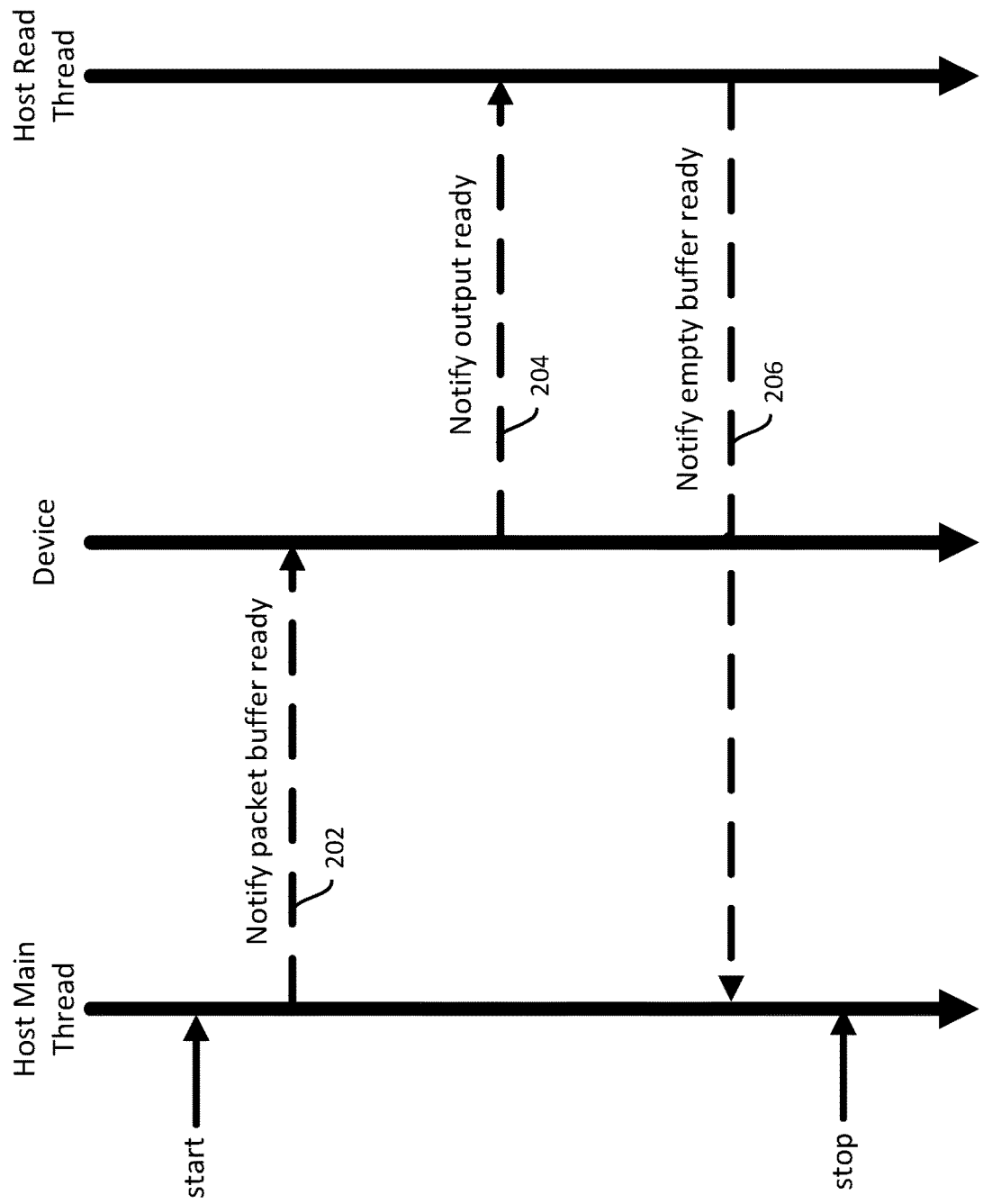
FIG. 2 is a flow diagram illustrating the use of a shared buffer with an synchronization mechanism between host and device.

To facilitate the communication between host and device, a shared buffer with a synchronization mechanism is often utilized. With this handshaking feature, the host predefines a shared data buffer and a flag. After the host has prepared the data to be dispatched to the device, the host flushes its cache into the system memory and raises a "ready" flag to indicate that the data is ready for the device to access. The device, which polls the "ready" flag, will access the data when it notices the flag has been raised. Then, after the device finishes processing the data, the device will raise a "device ready" flag to indicate to the host that it can continue to the next round of data. As illustrated in FIG. 2, after the host main thread prepares the data, it notifies the device that the input data is ready (i.e., 202). This may be done by the host main thread setting a ready flag. The device receives the notification by polling the ready flag. After the device accesses the data, it notifies a host reading thread that the output data is ready for the host to access (i.e., 204). After the host reading thread accesses the output data, the host reading thread may then notify the host main thread that the shared buffer is ready to be used again (i.e., 206).

For compute workloads that are partitioned between the host (e.g., central processing unit (CPU)) and device (e.g., graphics processing unit (GPU)), the workloads are normally divided into stages where some stages are performed by the host and some by the device. Explicit cache flushing is required when transitioning between host and device processing stages. However, cache flushing requires a significant amount of host processing cycles, thus slowing down performance and consuming energy. The cost is proportional to the size of the cache frame.

Existing solution, such as cache line flush (e.g., CLFLUSH), cache line writeback (e.g., CLWB), and writeback invalidate (e.g., WBINV) instructions have their shortcomings and do not adequately address the overhead cost associated with flushing the cache. For cache line flush and cache line write back instructions, the writeback of data to system memory requires one instruction per cache line. For a data block of ~3 MB, this can take up to 1 ms of processor time and requires tens of thousands of instructions. This incurs significant overheads especially in the case of large data blocks. As for the writeback invalidate instruction, which invalidates the whole cache and writes back any dirty cache lines to system memory, it requires a switch to kernel code because such instruction is often implemented as a privileged instruction. A kernel use-space switch itself is associated with significant overhead which may wipe out any time and/or resources saved over not using single cache line instructions such as CLFLUSH and CLWB. In addition, with the writeback invalidate instruction, the whole processor cache is invalidated. This means useful code and data that are currently or soon-to-be used by the processor will also be invalidated and need to be brought back into the cache. This in turn slows down performance. To solve the shortcomings associated with existing solutions, a new set of range-based memory writeback instructions is described herein. The new set of instructions allows the processor to only issue one instruction (or a few instructions depending on the number of memory regions) to flush the shared system memory without performing any context switch. With the new approach, significant amount of host processing cycles can be saved and redirected to other tasks, thereby improving overall performance and user experience. Not to mention the reduction in power consumption and improved energy efficiency, which is crucial in modern computing, especially when it comes to mobile devices.

Figure 3:
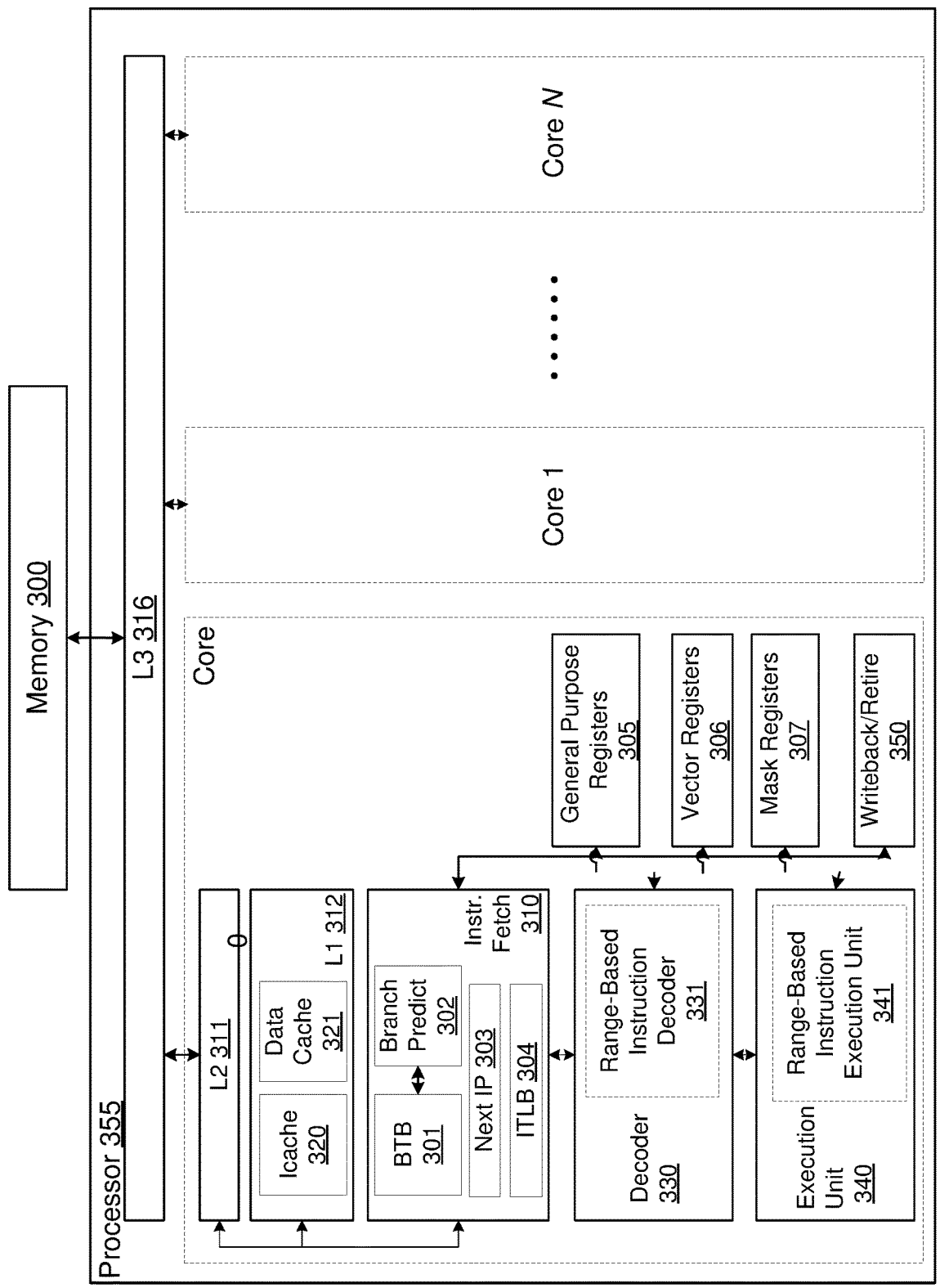
FIG. 3 illustrates an exemplary platform on which embodiments of the invention may be implemented.

FIG. 3 illustrates an exemplary processor 355 on which embodiments of the invention may be implemented. Processor 355 includes a set of general purpose registers (GPRs) 305, a set of vector registers 306, and a set of mask registers 307. The details of a single processor core ("Core 0") are illustrated in FIG. 3 for simplicity. It will be understood, however, that each core shown in FIG. 3 may have the same set of logic as Core 0. For example, each core may include a dedicated Level 1 (L1) cache 312 and Level 2 (L2) cache 311 for caching instructions and data according to a specified cache management policy. The L1 cache 312 includes a separate instruction cache 320 (IL1) for storing instructions and a separate data cache 321 (DL1) for storing data. The instructions and data stored within the various processor caches are managed at the granularity of cache lines which may be a fixed size (e.g., 64, 128, 512 Bytes in length). Each core of this exemplary embodiment has an instruction fetch unit 310 for fetching instructions from main memory 300 and/or a shared Level 3 (L3) cache 316; a decode unit 330 for decoding the instructions (e.g., decoding program instructions into micro-operatons or "uops"); an execution unit 340 for executing the instructions; and a writeback unit 350 for retiring the instructions and writing back the results.

The instruction fetch unit 310 includes various well known components including a next instruction pointer 303 for storing the address of the next instruction to be fetched from memory 300 (or one of the caches); an instruction translation look-aside buffer (ITLB) 304 for storing a map of recently used virtual-to-physical instruction addresses to improve the speed of address translation; a branch prediction unit 302 for speculatively predicting instruction branch addresses; and branch target buffers (BTBs) 301 for storing branch addresses and target addresses. Once fetched, instructions are then streamed to the remaining stages of the instruction pipeline including the decode unit 330, the execution unit 340, and the writeback unit 350. The structure and function of each of these units is well understood by those of ordinary skill in the art and will not be described here in detail to avoid obscuring the pertinent aspects of the different embodiments of the invention.

In one embodiment, the decode unit 330 includes a range-based instruction decoder 331 for decoding the range-based memory writeback instructions described herein (e.g., into sequences of micro-operations in one embodiment) and the execution unit 340 includes range-based instruction execution unit 341 for executing the decoded range-based memory writeback instructions.

Figure 4A:
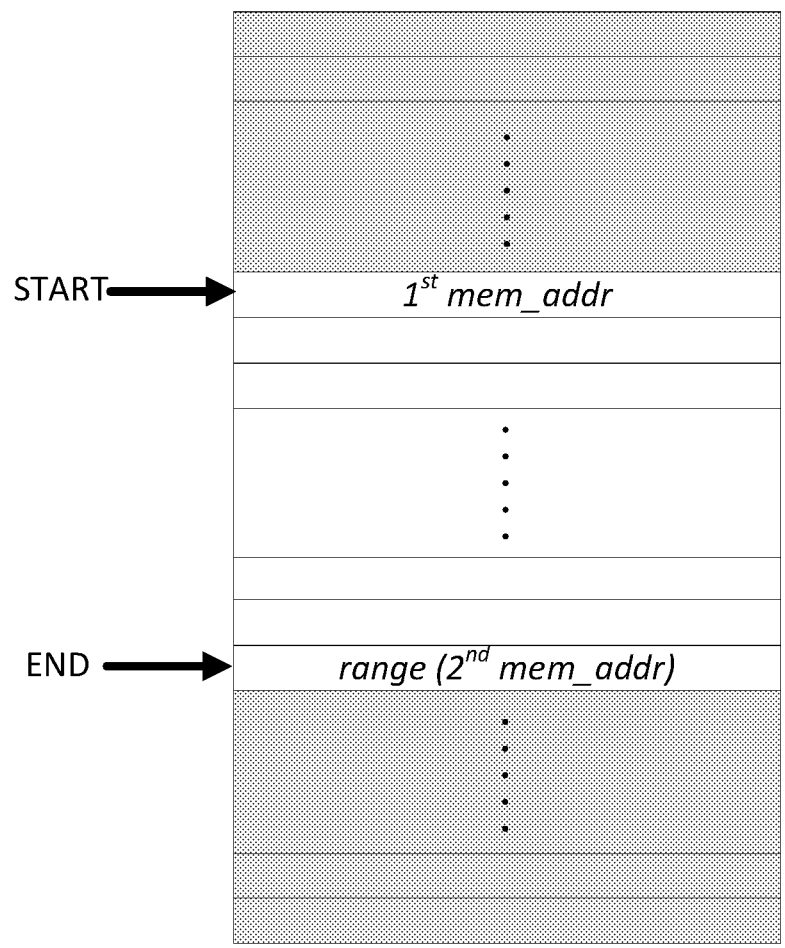
FIG. 4A illustrates the contiguous region in system memory defined by the memory address and range operands when they are both memory addresses according to an embodiment.

For range-based flushing of a processor cache, instruction ARFLUSH is described below. According to an embodiment, the ARFLUSH instruction is in the following format:

ARFLUSH{S} mem_addr, range where the mem_addr operand is a memory address, the range operand is a range indicator, and S is an optional opcode. Together, the mem_addr operand and the range operand define a contiguous region in the system memory. For instance, in one embodiment, the mem_addr operand is a first memory address for indicating the starting point of the contiguous region in system memory and the range operand is a second memory address for indicating the end point of the contiguous region. According to an embodiment, the memory address is a linear memory address that specifies a location in the system memory. In other embodiments, the memory address could be an effective memory address, a virtual memory address, or a physical memory address (including guest physical memory address). FIG. 4A illustrates the contiguous region in system memory defined by the memory address and range operands when they are both memory addresses according to an embodiment. The ARFLUSH instruction invalidates all cache lines in the processor cache that contain a memory address included in the contiguous region. The processor cache referred to here may be IL1, DL1, L2, or a combination thereof. In some embodiments, the invalidation is broadcasted throughout the cache coherence domain and may include cache(s) on other core(s). In one embodiment, any invalidated cache lines in the processor cache that are dirty (e.g., modified) are written back to the system memory. In one embodiment, this is done via a writeback operation or an eviction mechanism.

In another embodiment, the range operand is not a memory address but rather an integer value (i.e., "r") indicating the number of cache lines to be invalidated. According to the embodiment, the contiguous region in system memory starts at the memory address indicated by the mem_addr operand and continues for a number (i.e., "r") of cache lines indicated by the range operand. In other words, the "r" number of cache lines included in the contiguous region all have a memory address that is equal to or incrementally larger (or smaller, depending on the implementation) than the mem_addr operand. Alternatively, instead of the cache lines, the range operand could indicate the number of bytes to be included in the contiguous region. The contiguous region starts at the memory address indicated by the mem_addr operand and continues for the number of bytes indicated by the range operand.

Figure 4B:
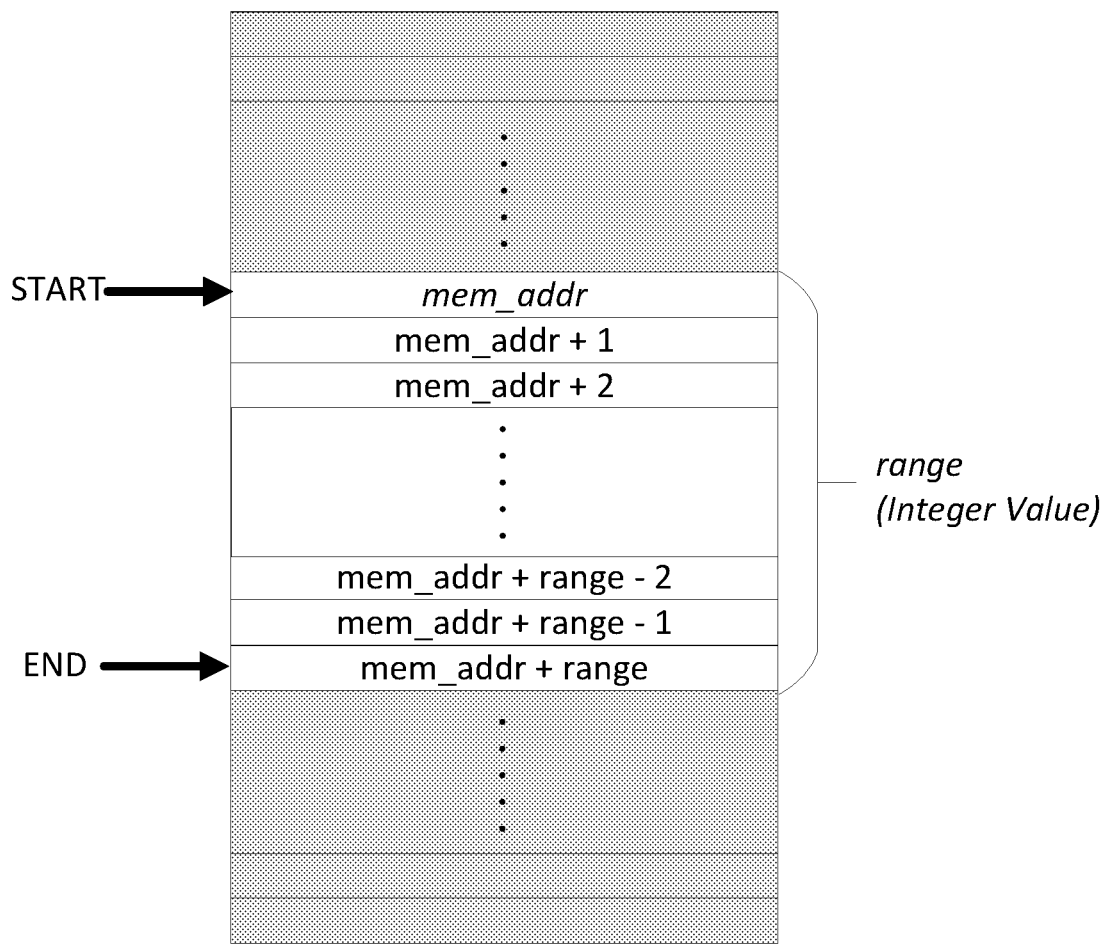
FIG. 4B illustrates the contiguous region in system memory defined by the memory address and range operands where the range is an integer value in accordance to an embodiment.

FIG. 4B illustrates the contiguous region in system memory defined by the memory address and range operands where the range is an integer value in accordance to an embodiment. In one embodiment, the ARFLUSH invalidates all the cache lines in the processor cache that contain a memory address that is equal to or incrementally larger than the mem_addr operand for a number of cache lines as indicated by the integer value in the range operand.

The optional opcode {S}, according to an embodiment, indicates shared cache. In one embodiment, the ARFLUSHS instruction behaves exactly the same as the ARFLUSH instruction, but flushes out cache lines in the contiguous region to a shared cache instead of all the way to system memory. According to an embodiment, shared cache is a cache that is shared by two or more processor cores in a host processor.

According to an embodiment, the ARFLUSH instruction is ordered by fencing operations such as MFENCE, SFENCE, lock-prefixed instructions, or architecturally serializing instructions. In another implementation, it could be a subset of those instructions (e.g. only serializing instructions). In another embodiment, it could be naturally more strongly ordered (e.g. as part of a TSO coherency model). The operating system and/or software running on the operating system may use these ordering instructions to ensure the desired ordering of the instructions. In one embodiment, the ARFLUSH instruction can be used at all privilege levels and is subject to all permission checking and faults associated with the byte load.

For range-based writeback of cache lines in a processor cache, instruction ARWB is described below. According to an embodiment, the ARWB instruction is in the following format:

ARWB {S} mem_addr, range where the mem_addr operand is a memory address, the range operand is a range indicator, and S is an optional opcode. Similar to the ARFLUSH instruction described above, the mem_addr operand and the range operand together define a contiguous region in the system memory. For instance, in one embodiment, the mem_addr operand is a memory address indicating the starting point of the contiguous region in system memory and the range operand is another memory address indicating the end point of the contiguous region. According to an embodiment, the memory address is a linear memory address that specifies a location in the system memory. In other embodiments, the memory address could be an effective memory address, a virtual memory address, or a physical memory address (including guest physical memory address). According to the embodiment, the ARWB instruction writes back from the processor cache to system memory all dirty (i.e., modified) cache lines that have a memory address falling in the contiguous region defined by the mem_addr and the range operand. The processor cache referred to here may be ILL DL1, L2, or a combination thereof. In some embodiments, the writeback is broadcasted throughout the cache coherence domain and may include cache(s) on other core(s). For the cache lines in the contiguous region that are not dirty (i.e., unmodified), they may be retained in the cache hierarchy.

The ARWB instruction presents a performance increase over instructions that invalidate both dirty and clean cache lines. By not invalidating unmodified cache lines, the ARWB instruction reduces cache misses in subsequent cache accesses. In one embodiment, the hardware can choose to retain the unmodified cache lines in any level of the cache hierarchy or simply invalidates them.

In another embodiment, the range operand is not a memory address but rather an integer value (i.e., "r") indicating the number of cache lines to be invalidated. According to the embodiment, the contiguous region in system memory starts at the memory address indicated by the mem addr operand and continues for a number (i.e., "r") of cache lines indicated by the range operand. In other words, the "r" number of cache lines included in the contiguous region all have a memory address that is equal to or incrementally larger (or smaller, depending on the implementation) than the mem_addr operand. In one embodiment, the ARWB writes back all dirty cache lines in the processor cache having a memory address that is equal to or incrementally larger (or smaller) than the mem addr operand for a number of cache lines indicated by the integer value of the range operand. Alternatively, instead of the cache lines, the range operand could indicate the number of bytes to be included in the contiguous region. The contiguous region starts at the memory address indicated by the mem_addr operand and continues for the number of bytes indicated by the range operand.

The optional opcode {S}, according to an embodiment, indicates shared cache. In one embodiment, the ARWBS instruction behaves exactly the same as the ARWB instruction. The only difference being that the ARWBS instruction writes back dirty cache lines in the contiguous region to a shared cache rather than the system memory. According to an embodiment, shared cache is a cache that is shared by two or more processor cores in a host processor.

According to an embodiment, the ARWB is only ordered by the store. As such, the operating system and/or software running on the operating system can use SFENCE, MFENCE, or lock-prefixed instructions to achieve desired ordering. In one embodiment, the ARWB instruction described herein can be used at all privilege levels and is subject to all permission checking and faults associated with the byte load. For usages that do not require complete data flush and subsequent access of the data is expected, ARWB instruction may be preferred over other instructions.

According to an embodiment, hardware implementations for carrying out the instructions described herein relies heavily on the processor architecture. Specifically, processors with different levels of cache hierarchy will dictate different implementation requirements. The same applies to cache inclusion policies. For example, in a processor with L1/L2 inclusive caches, flushing the L2 cache alone may be sufficient because any invalidated cache lines in L2 will be back-snooped in L1. The hardware implementation, according to an embodiment, may be simplified based on certain assumptions that can be made with respect to operating system and/or software running on the operating system. For example, as mentioned above, the operating system and/or software will ensure that any affected memory range is not accessed by another running thread.

In one embodiment, the range-based memory writeback instructions leverage existing hardware to reduce implementation cost. For example, a cache shrink or flush engine for existing instructions such as WBINV can scan through particular way(s) of the processor cache and evict dirty lines. Also, an existing array testing register for device debugging and testing may provide the datapath (e.g., an array read/write MUXing with normal functional path) and control logic (e.g., an address scanning finite state machine (FSM)) that can be largely shared by the range-based memory writeback instructions described herein.

Figure 5:
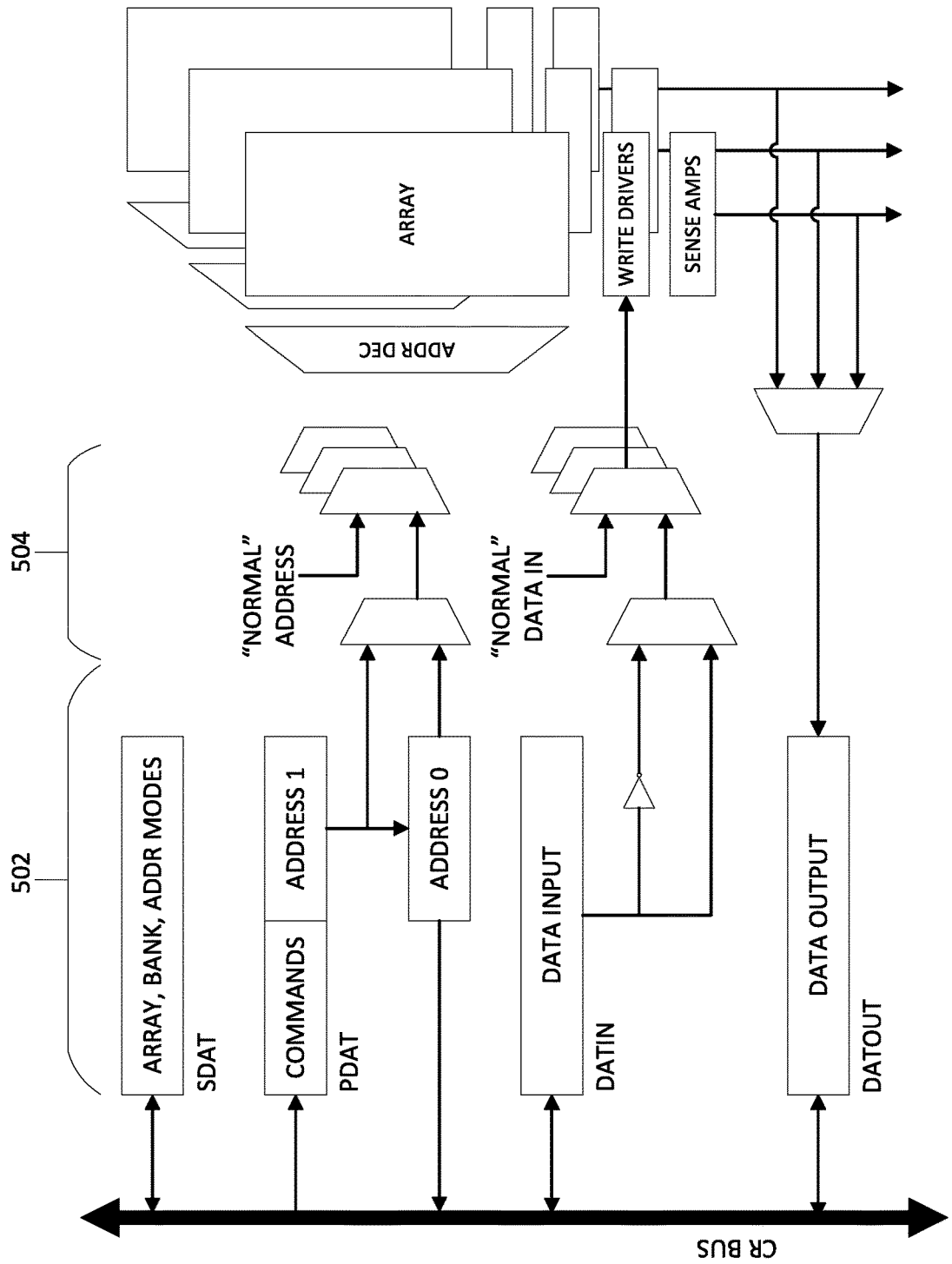
FIG. 5 illustrates an exemplary large data array testing (LDAT) engine for device debugging and testing that may be used to implement embodiments of the present invention.

FIG. 5 illustrates an exemplary large data array testing (LDAT) engine for device debugging and testing that may be used to implement embodiments of the present invention. The datapath 502 and control logic 504 may be re-used for implementing the ARFLUSH and ARWB instructions disclosed herein. In certain embodiments, if overloading on existing internal control registers (e.g., machine specific registers (MSRs) such as PDAT/SDAT) is not preferable, a separate set of internal control registers may be defined.

According to an embodiment, a set of internal control registers is used to track the cache lines whose address is in the contiguous region of the system memory defined by the range-based memory writeback instructions described herein. Then each of the cache lines are then flushed or written back to system memory. In one embodiment, this is performed by calling a respective CLFLUSH/CLWB instruction described above.

However, in some instances, it may be undesirable to have microcode issue an request for each line. In such instances, according to an embodiment, a set of internal control registers are configured and then a FSM is triggered to scan through the specified address range following the operation and logic described below. A status bit is set upon the completion of the whole flow, which will then be checked by an ordering instruction (e.g., MFENCE) for serialization purpose.

Figure 6:
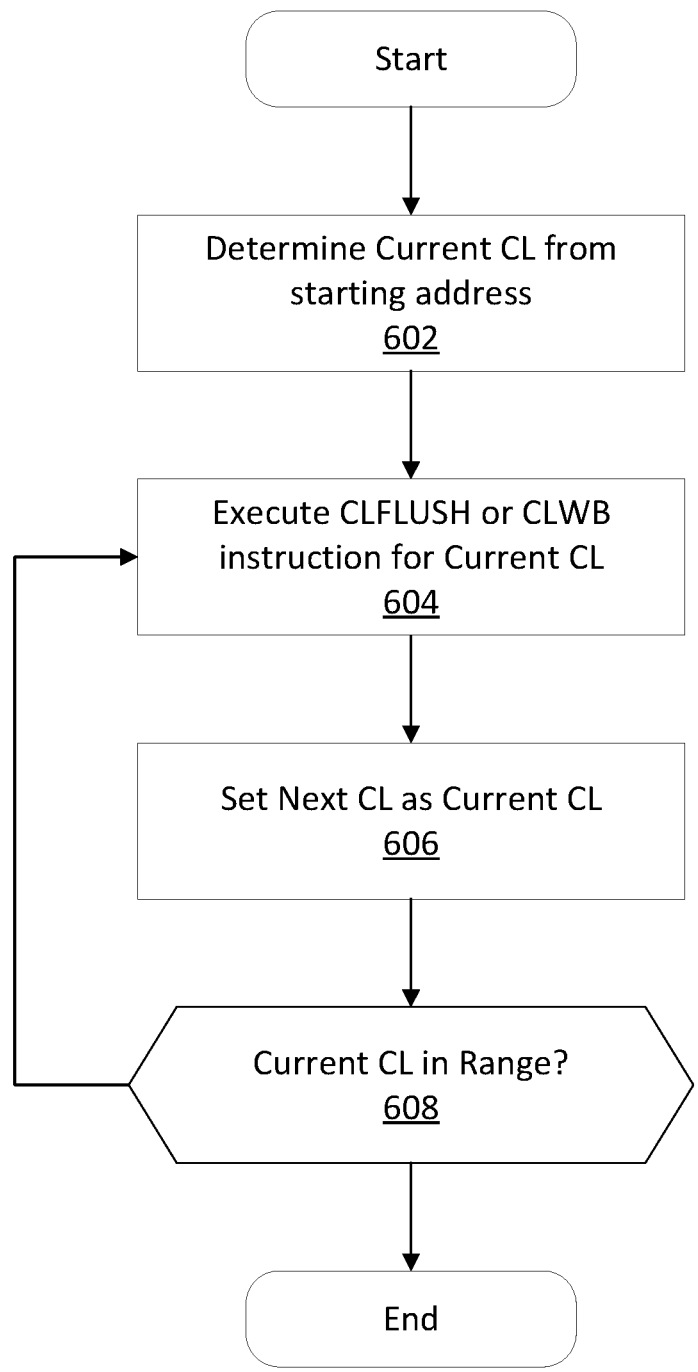
FIG. 6 is a flow chart illustrating the operations and logic for executing the range-based memory writeback instruction in accordance to an embodiment

FIG. 6 is a flow chart illustrates the logic and operation of the range-based memory writeback instruction in accordance to an embodiment. A block 602, a current cache line (Current CL) is determined based on the mem_addr operand (i.e., starting memory address) of the instruction. At block 604, a cache line flush or cache line writeback instruction is executed for the current cache line. At block 608, the next cache line is set as the current cache line. In one embodiment, the next cache line has a memory address that is equal to or incrementally larger than the memory address of the current cache line. At block 610, a determination is made on whether the current cache line is in the range, such that the address of the current cache line falls in the contiguous region of system memory defined by the starting memory address and range indicator operands of the instruction. If the current cache line is in range, a cache line flush or writeback instruction is executed for the current cache line at block 604. If, however, the current cache line is not in range, signifying the end of the contiguous region in system memory, the process ends.

Figure 7:
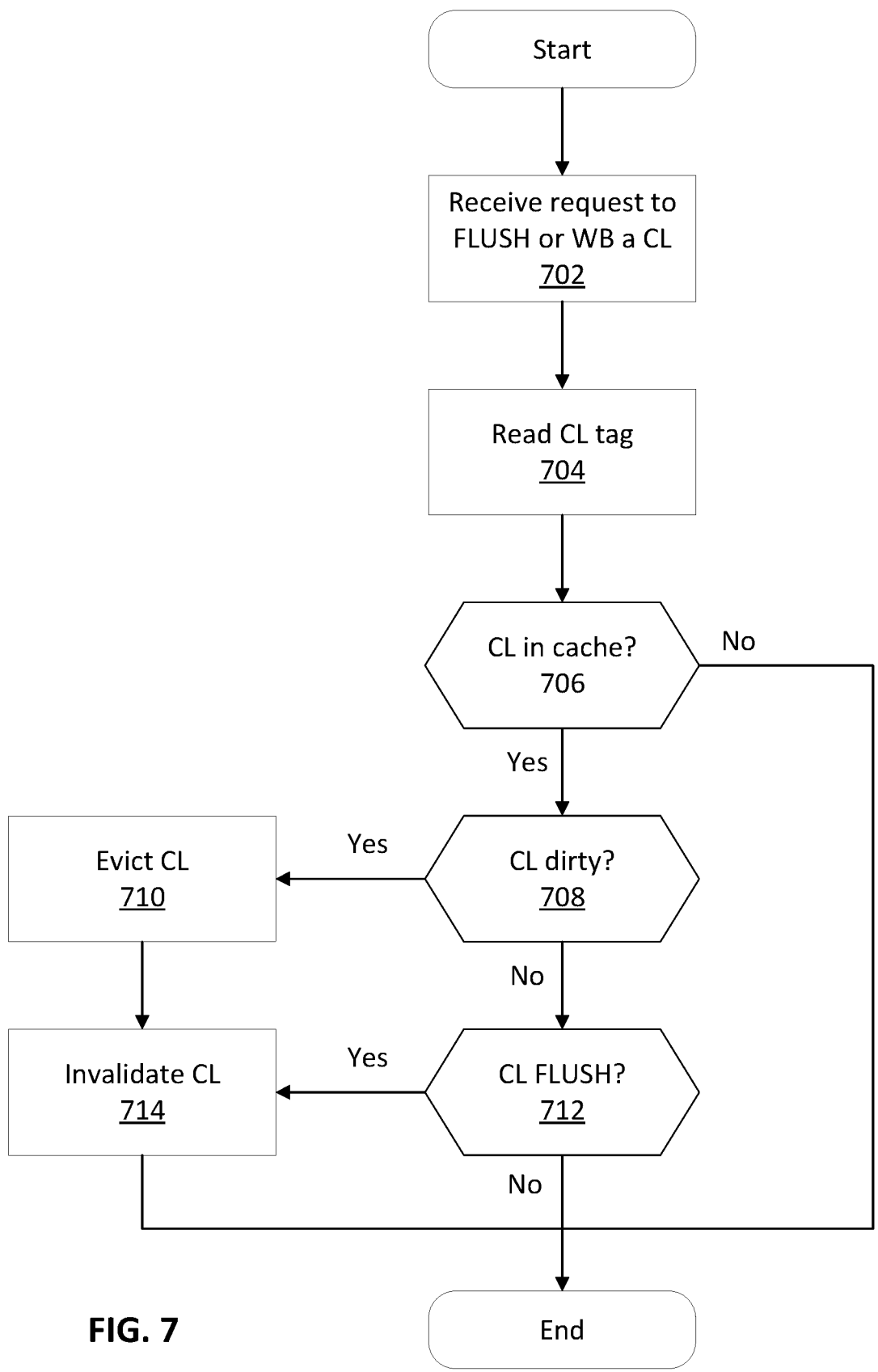
FIG. 7 is a flow chart illustrating the operation and logic for flushing a cache line according to an embodiment.

FIG. 7 is a flow chart illustrating the logic and operation for flushing a cache line according to an embodiment. At block 702, a request is received to flush or writeback a cache line (CL) to system memory. In one embodiment, the cache line is the current cache line described in FIG. 6 that is in range. At block 704, the cache line tag is read. In an embodiment, a microcode triggers a tag read to read the state of the cache line. Then, at block 706, a determination is made on whether the cache line is cached in the processor cache. If the cache line is not found in the processor cache, no action is needed and the operation ends. On the other hand, if cache line is found in the processor cache, another determination is made at block 708 on whether the cache line is dirty. In one embodiment, a dirty cache line is one that has been modified but not yet written back to system memory. If the cache line is found to be dirty, it is evicted at block 710. According to an embodiment, the eviction of the cache line is made through the normal or existing eviction mechanism. Once the cache line has been evicted, thereby stored to system memory via a cache line writeback, the state of the cache line may be updated in the processor cache. For example, this may be performed by changing the state tag of the cache line to "I" (invalidate) or "E" (exclusive). If, however, back at block 708 the cache line is found not to be dirty (i.e., unmodified), a determination is made at block 712 on whether the cache line is to be flushed or invalidated. According to an embodiment, this is based on whether the request is to flush/invalidate the cache line or simply to writeback to memory. As described above, an ARFLUSH instruction flushes/invalidates a cache line in the processor cache irrespective of whether the cache line is dirty or not. On the other hand, an ARWB instruction does not flush/invalidate cache lines that are not dirty (i.e., unmodified). If a cache line is to be flushed, the state of the cache line is updated in the processor cache at block 714. As discussed above, this may be done by changing the state tag of the cache line to "I" (invalidate) or "E" (exclusive). Alternatively, the state tag of the cache line may be changed to other states depending on the desired implementation. If, however, the cache line is not to be flushed, no change is made to the cache line tag and the process ends.

One embodiment of the present invention is an apparatus that includes a system memory; a plurality of hardware processor cores each of which include a first caches; a decoder circuitry to decode an instruction having fields for a first memory address and a range indicator which, together, define a contiguous region in the system memory having one or more cache lines; and an execution circuitry to execute the decoded instruction by invalidating in the first cache any instances of the one or more cache lines. In one embodiment, any invalidated instances of the one or more cache lines in the first cache that are dirty are stored to the system memory. In some embodiments, the instruction may include an opcode to indicate whether the dirty invalidated instances of the one or more cache lines in the first cache are to be stored to a second cache shared by the plurality of hardware processor cores, instead of the system memory. With respect to the range indicator, in some embodiments, it includes a second memory address such that the contiguous region spans from the first memory address to the second memory address. In other embodiments, the range indicator includes an indication of the number of cache lines that are included in the contiguous region such that each of the included cache lines has an address equal to or incrementally larger than the first memory address. In one embodiment, the first memory address is a linear memory address.

Another embodiment of the present invention is an apparatus that includes an apparatus that includes a system memory; a plurality of hardware processor cores each of which includes a first cache; a decoder circuitry to decode an instruction having fields for a first memory address and a range indicator which, together, define a contiguous region in the system memory having one or more cache lines; and an execution circuitry to execute the decoded instruction by causing any dirty instances of the one or more cache lines in the first cache to be stored to the system memory. In some embodiments, the instruction may include an opcode to indicate whether the dirty instances of the one or more cache lines in the first cache are to be stored to a second cache shared by the plurality of hardware processor cores instead of to the system memory. With respect to the range indicator, in some embodiments, it includes a second memory address such that the contiguous region to span from the first memory address to the second memory address. In other embodiments, the range indicator includes an indication of the number of cache lines that are included in the contiguous region such that each of the included cache lines has an address equal to or incrementally larger than the first memory address. In one embodiment, the first memory address is a linear memory address.

Another embodiment of the present invention is a method that includes decoding an instruction having fields for a first memory address and a range indicator which, together, define a contiguous region in a system memory having one or more cache lines; and executing the decoded instruction by invalidating in a first processor cache any instances of the one or more cache lines. In some embodiments, executing decoded instruction includes storing any invalidated instances of the one or more cache lines in the first processor cache that are dirty to the system memory. In other embodiments, executing the decoded instruction includes storing any invalidated instances of the one or more cache lines from the first processor cache that are dirty to a second cache which is shared by a plurality of hardware processor cores. With respect to the range indicator, in some embodiments, it includes a second memory address such that the contiguous region to span from the first memory address to the second memory address. In other embodiments, the range indicator includes an indication of the number of cache lines that are included in the contiguous region, such that each of the included cache lines has an address equal to or incrementally larger than the first memory address. In one embodiment, the first memory address is a linear memory address.

Yet another embodiment of the present invention is a method that includes decoding an instruction having fields for a first memory address and a range indicator which, together, define a contiguous region in a system memory having one or more cache lines; and executing the decoded instruction by causing any dirty instances of the one or more cache lines in a first processor cache to be stored to the system memory. In some embodiments, the instruction may include an opcode to indicate whether the dirty instances of the one or more cache lines in the first processor cache are to be stored to a second cache shared by a plurality of hardware processor cores instead of to the system memory. With respect to the range indicator, in some embodiments, it includes a second memory address such that the contiguous region to span from the first memory address to the second memory address. In other embodiments, the range indicator includes an indication of the number of cache lines that are included in the contiguous region such that each of the included cache lines has an address equal to or incrementally larger than the first memory address. In one embodiment, the first memory address is a linear memory address.

Figure 8:
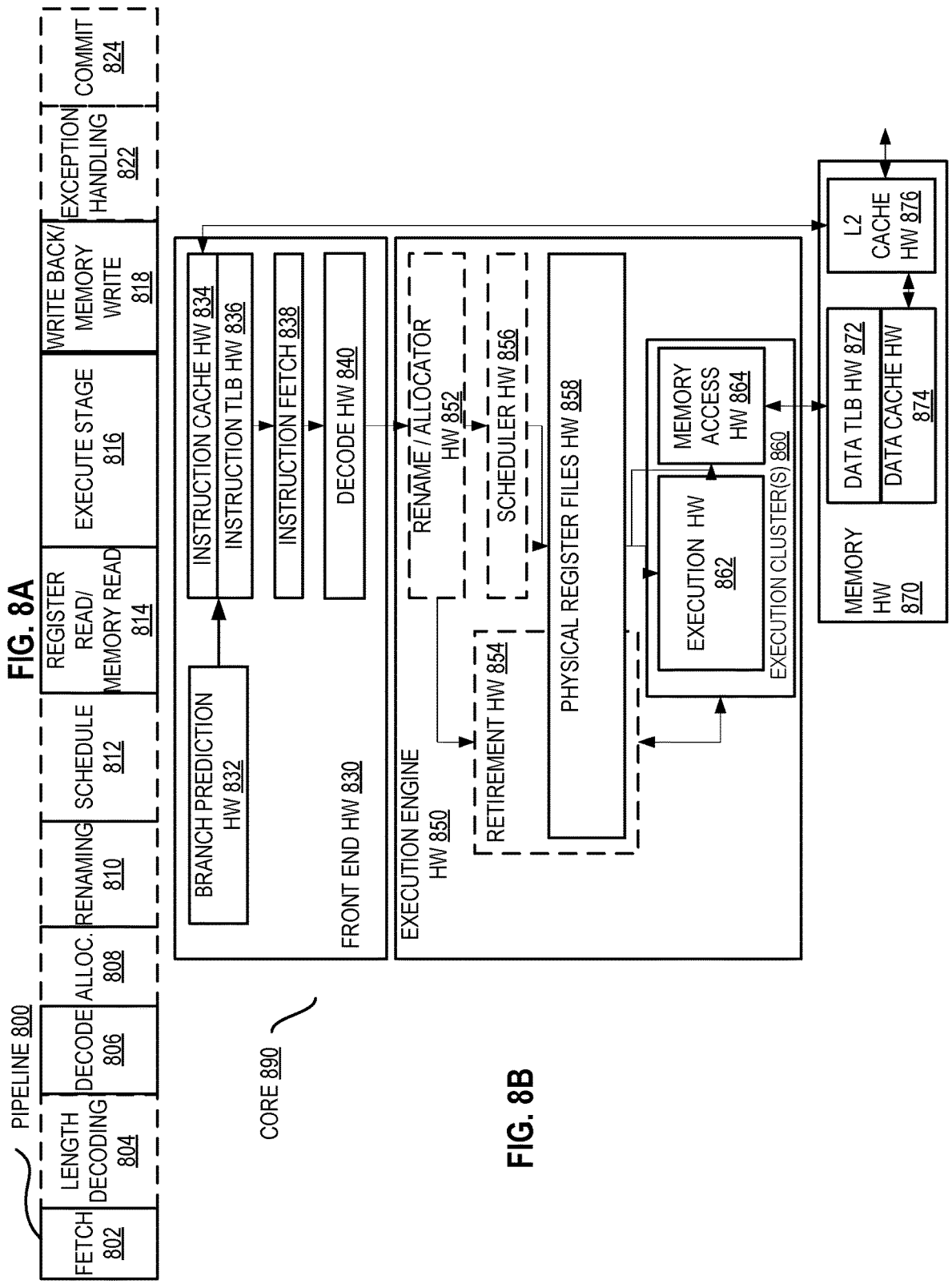
FIG. 8A is a block diagram illustrating both an exemplary in-order pipeline and an exemplary register renaming, out-of-order issue/execution pipeline according to embodiments of the invention.
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end hardware 830 coupled to an execution engine hardware 850, and both are coupled to a memory hardware 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end hardware 830 includes a branch prediction hardware 832 coupled to an instruction cache hardware 834, which is coupled to an instruction translation lookaside buffer (TLB) 836, which is coupled to an instruction fetch hardware 838, which is coupled to a decode hardware 840. The decode hardware 840 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode hardware 840 or otherwise within the front end hardware 830). The decode hardware 840 is coupled to a rename/allocator hardware 852 in the execution engine hardware 850.

The execution engine hardware 850 includes the rename/allocator hardware 852 coupled to a retirement hardware 854 and a set of one or more scheduler hardware 856. The scheduler hardware 856 represents any number of different schedulers, including reservations stations, central instruction window, etc. The scheduler hardware 856 is coupled to the physical register file(s) hardware 858. Each of the physical register file(s) hardware 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 858 comprises a vector registers hardware, a write mask registers hardware, and a scalar registers hardware. This register hardware may provide architectural vector registers, vector mask registers, and general purpose registers. The physical register file(s) hardware 858 is overlapped by the retirement hardware 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 854 and the physical register file(s) hardware 858 are coupled to the execution cluster(s) 860. The execution cluster(s) 860 includes a set of one or more execution hardware 862 and a set of one or more memory access hardware 864. The execution hardware 862 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 856, physical register file(s) hardware 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 864). It should also be understood that where separate pipelines are used, one or more of these pipelines may be out-of-order issue/execution and the rest in-order.

The set of memory access hardware 864 is coupled to the memory hardware 870, which includes a data TLB hardware 872 coupled to a data cache hardware 874 coupled to a level 2 (L2) cache hardware 876. In one exemplary embodiment, the memory access hardware 864 may include a load hardware, a store address hardware, and a store data hardware, each of which is coupled to the data TLB hardware 872 in the memory hardware 870. The instruction cache hardware 834 is further coupled to a level 2 (L2) cache hardware 876 in the memory hardware 870. The L2 cache hardware 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode hardware 840 performs the decode stage 806; 3) the rename/allocator hardware 852 performs the allocation stage 808 and renaming stage 810; 4) the scheduler hardware 856 performs the schedule stage 812; 5) the physical register file(s) hardware 858 and the memory hardware 870 perform the register read/memory read stage 814; the execution cluster 860 perform the execute stage 816; 6) the memory hardware 870 and the physical register file(s) hardware 858 perform the write back/memory write stage 818; 7) various hardware may be involved in the exception handling stage 822; and 8) the retirement hardware 854 and the physical register file(s) hardware 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 834/874 and a shared L2 cache hardware 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
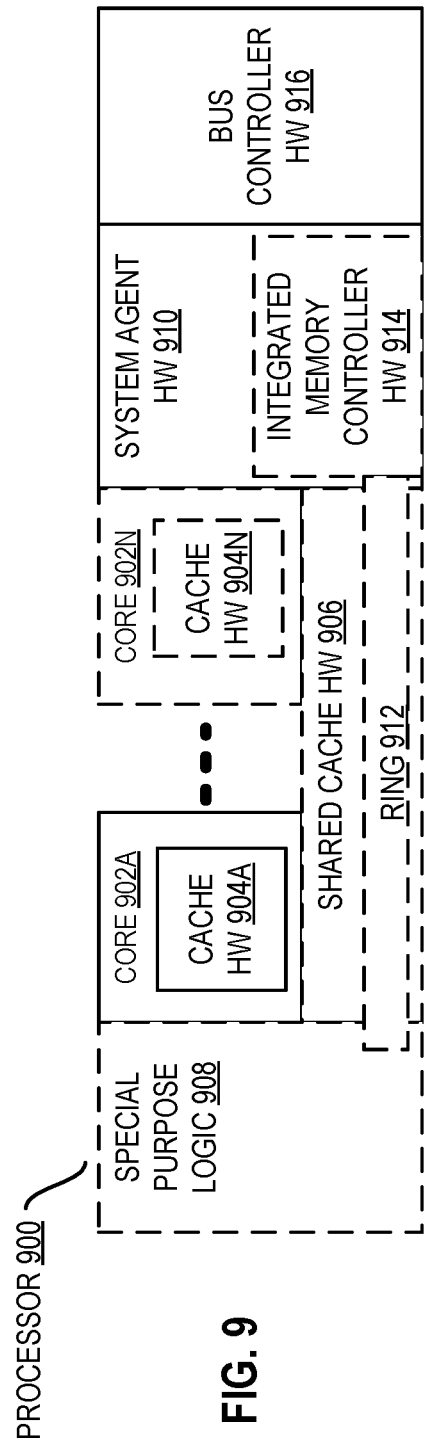
FIG. 9 is a block diagram of a single core processor and a multicore processor with integrated memory controller and graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller hardware 916, while the optional addition of the dashed lined boxes illustrates an alternative processor 900 with multiple cores 902A-N, a set of one or more integrated memory controller hardware 914 in the system agent hardware 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 906, and external memory (not shown) coupled to the set of integrated memory controller hardware 914. The set of shared cache hardware 906 may include one or more mid-level caches, such as level 2 (L2), level 3 (L3), level 4 (L4), or other levels of cache, a last level cache (LLC), and/or combinations thereof. While in one embodiment a ring based interconnect hardware 912 interconnects the integrated graphics logic 908, the set of shared cache hardware 906, and the system agent hardware 910/integrated memory controller hardware 914, alternative embodiments may use any number of well-known techniques for interconnecting such hardware. In one embodiment, coherency is maintained between one or more cache hardware 906 and cores 902-A-N.

In some embodiments, one or more of the cores 902A-N are capable of multi-threading. The system agent 910 includes those components coordinating and operating cores 902A-N. The system agent hardware 910 may include for example a power control unit (PCU) and a display hardware. The PCU may be or include logic and components needed for regulating the power state of the cores 902A-N and the integrated graphics logic 908. The display hardware is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set. In one embodiment, the cores 902A-N are heterogeneous and include both the "small" cores and "big" cores described below.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
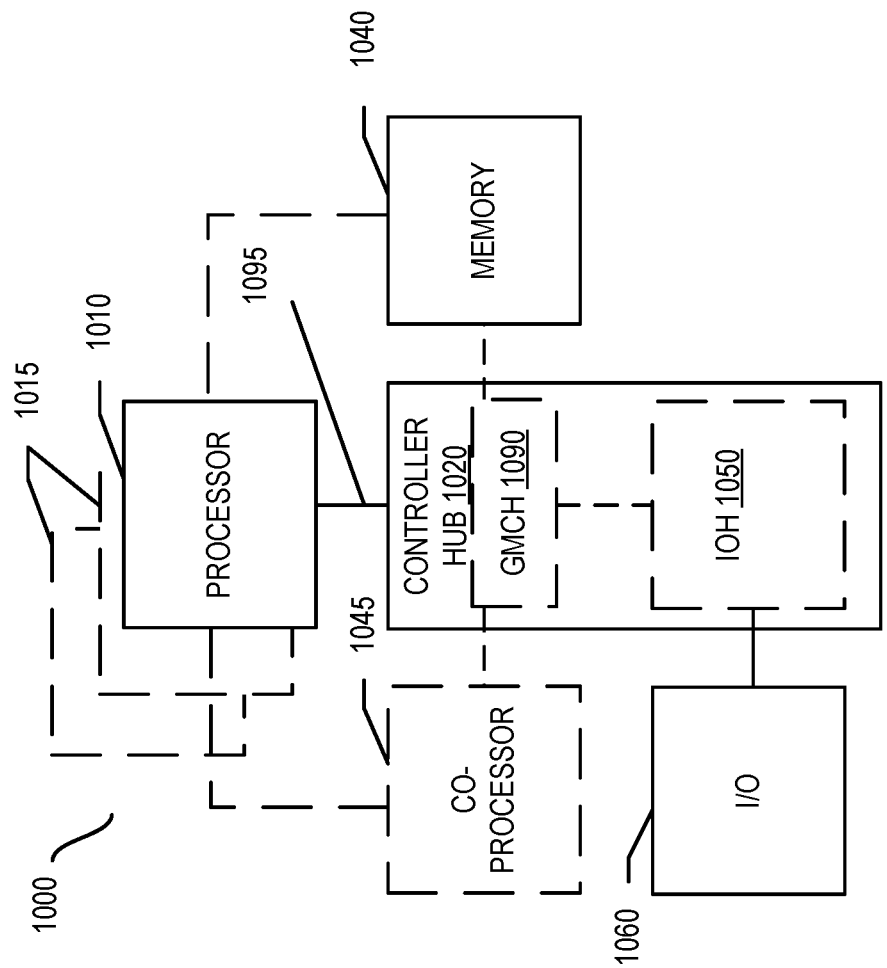
FIG. 10 illustrates a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment, the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface, or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
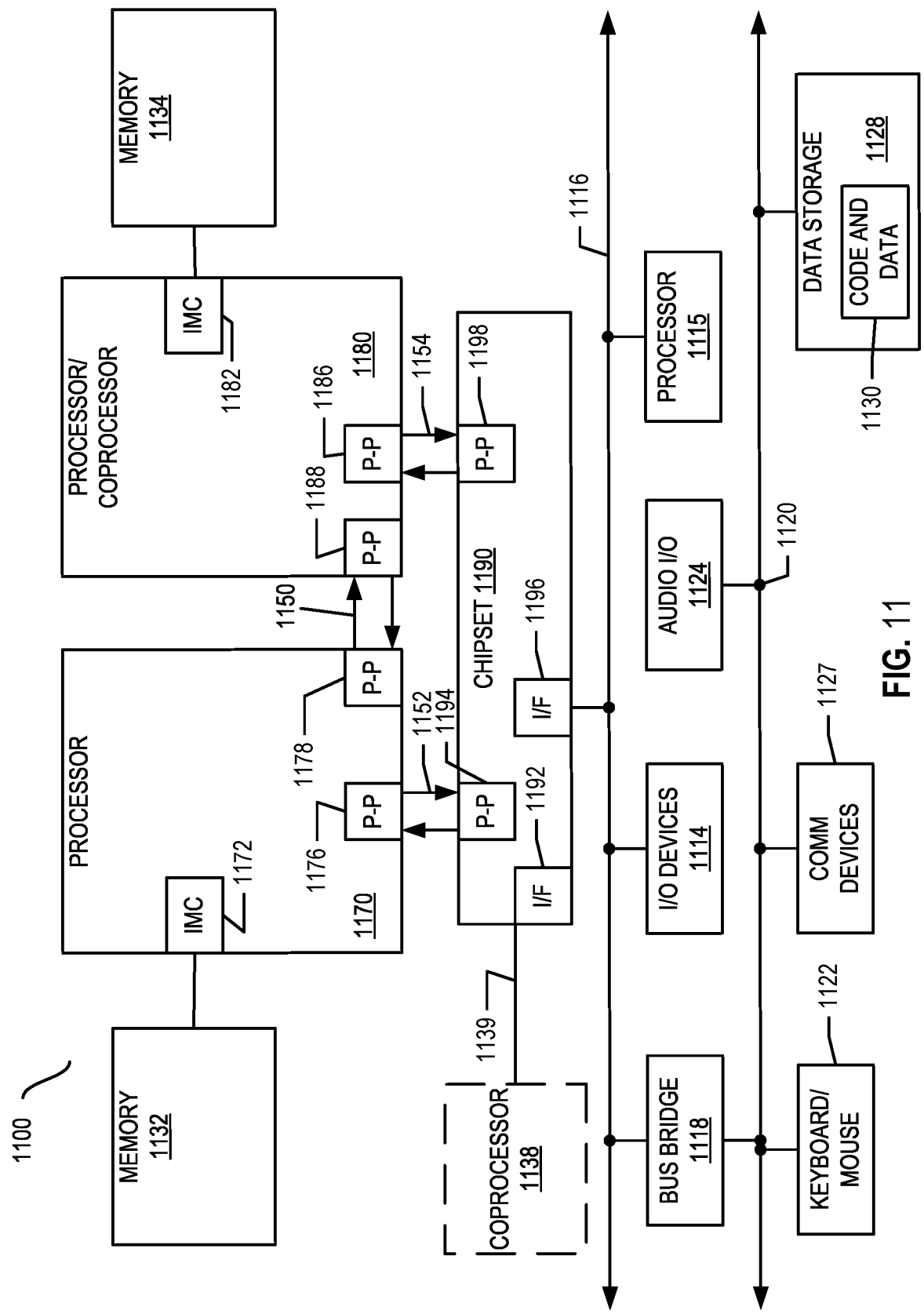
FIG. 11 illustrates a block diagram of a second system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) hardware 1172 and 1182, respectively. Processor 1170 also includes as part of its bus controller hardware point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) hardware), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage hardware 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
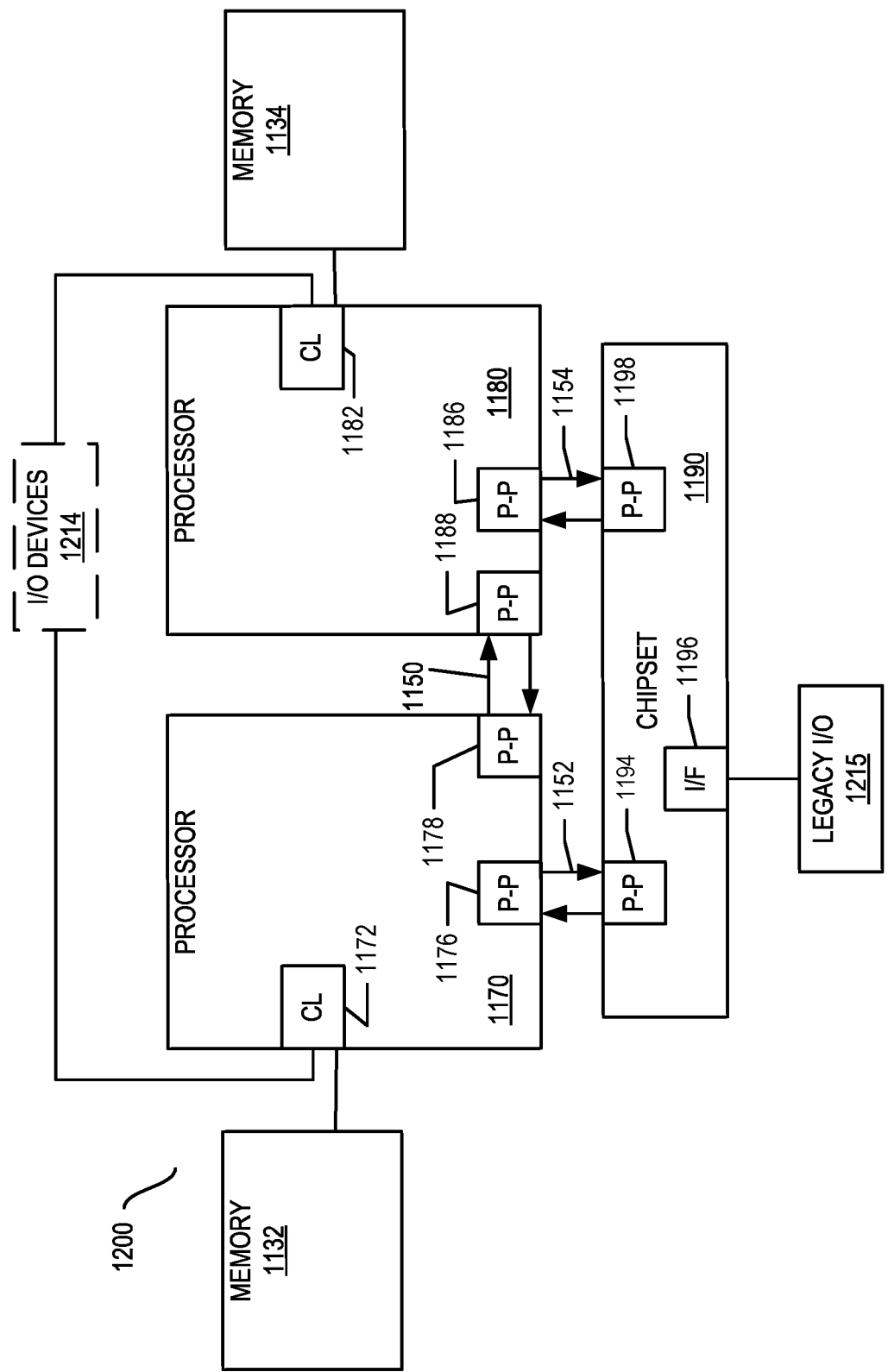
FIG. 12 illustrates a block diagram of a third system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller hardware and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
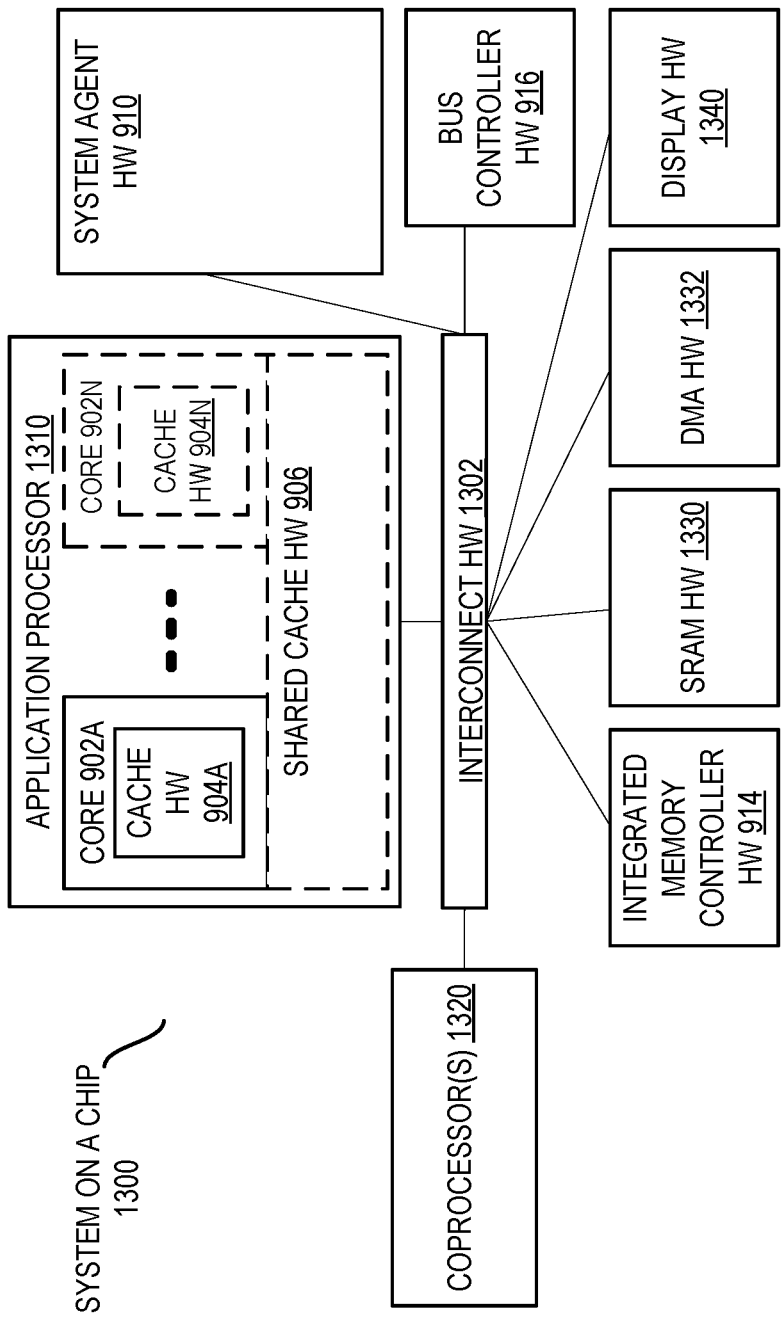
FIG. 13 illustrates a block diagram of a system on a chip (SoC) in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect hardware 1302 is coupled to: an application processor 1310 which includes a set of one or more cores 902A-N and shared cache hardware 906; a system agent hardware 910; a bus controller hardware 916; an integrated memory controller hardware 914; a set or one or more coprocessors 1320 which may include integrated graphics logic, an image processor, an audio processor, and a video processor; an static random access memory (SRAM) hardware 1330; a direct memory access (DMA) hardware 1332; and a display hardware 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable' s (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
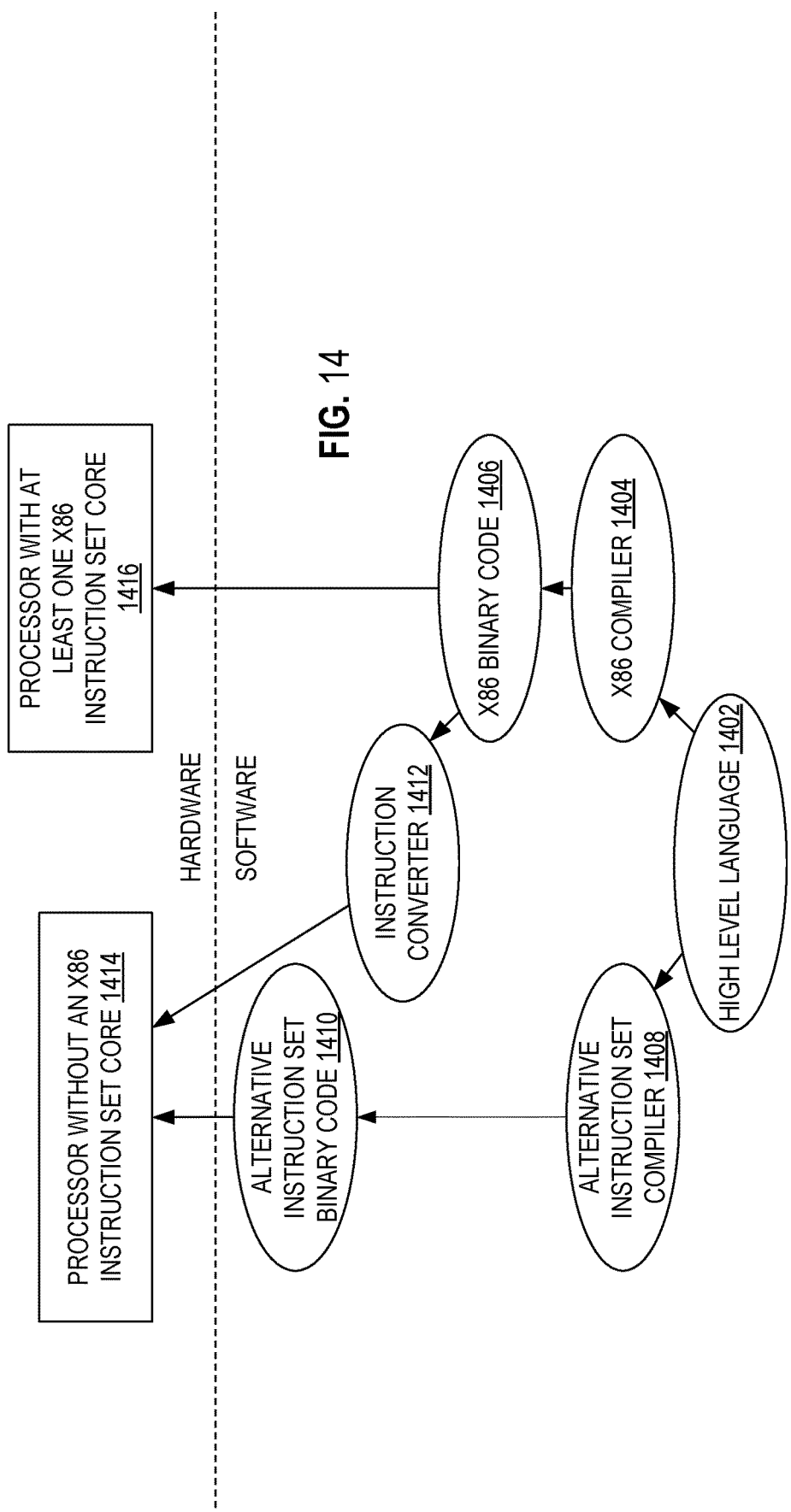
FIG. 14 illustrates a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
a system memory;
a plurality of hardware processor cores, wherein each of the hardware processor cores to include a first cache;
a decoder circuitry to decode an instruction having fields for a first memory address and a range indicator, the first memory address and the range indicator to define a contiguous region in the system memory, the contiguous region comprising one or more cache lines; and
an execution circuitry to execute the decoded instruction by invalidating in the first cache any instances of the one or more cache lines;
wherein an invalidated instance of the one or more cache lines in the first cache is to be stored to the system memory when the invalidated instance is dirty; and
wherein the instruction further comprises an opcode to indicate whether the dirty invalidated instance of the one or more cache lines in the first cache is to be stored to a second cache shared by the plurality of hardware processor cores instead of the system memory.

2. The apparatus of claim 1, wherein the range indicator comprises a second memory address, the contiguous region to span from the first memory address to the second memory address.

3. The apparatus of claim 1, wherein the range indicator comprises an indication of a number of bytes or cache lines to be included in the contiguous region, the included cache lines having address equal to or incrementally larger than the first memory address.

4. The apparatus of claim 1, wherein the first memory address is a linear memory address.

5. An apparatus comprising:
a system memory;
a plurality of hardware processor cores, wherein each of the hardware processor cores to include a first cache;
a decoder circuitry to decode an instruction having fields for a first memory address and a range indicator, the first memory address and the range indicator to define a contiguous region in the system memory, the contiguous region comprising one or more cache lines; and
an execution circuitry to execute the decoded instruction by causing any dirty instances of the one or more cache lines in the first cache to be stored to the system memory,
wherein the instruction further comprises an opcode to indicate whether a dirty instance of the one or more cache lines in the first cache is to be stored to a second cache shared by the plurality of hardware processor cores instead of to the system memory.

6. The apparatus of claim 5, wherein the range indicator comprises a second memory address, the contiguous region to span from the first memory address to the second memory address.

7. The apparatus of claim 5, wherein the range indicator comprises an indication of a number of bytes or cache lines to be included in the contiguous region, the included cache lines having address equal to or incrementally larger than the first memory address.

8. The apparatus of claim 5, wherein the first memory addresses is a linear memory address.

9. A method comprising:
decoding an instruction having fields for a first memory address and a range indicator, the first memory address and the range indicator to define a contiguous region in a system memory, the contiguous region comprising one or more cache lines;
executing the decoded instruction by invalidating, in a first processor cache, any instances of the one or more cache lines; and
storing an invalidated instance of the one or more cache lines in the first processor cache to the system memory when the invalidated instance is dirty;
wherein the instruction further comprises an opcode to indicate whether the dirty invalidated instance of the one or more cache lines in the first cache is to be stored to a second cache shared by the plurality of hardware processor cores instead of the system memory.

10. The method of claim 9, wherein the range indicator comprises a second memory address, the contiguous region to span from the first memory address to the second memory address.

11. The method of claim 9, wherein the range indicator comprises an indication of a number of bytes or cache lines to be included in the contiguous region, the included cache lines having address equal to or incrementally larger than the first memory address.

12. The method of claim 9, wherein the first memory address is a linear memory address.

13. A method comprising:
   decoding an instruction having fields for a first memory address and a range indicator, the first memory address and the range indicator to define a contiguous region in a system memory, the contiguous region comprising one or more cache lines; and
   executing the decoded instruction by causing any dirty instances of the one or more cache lines in a first processor cache to be stored to the system memory;
   wherein the instruction further comprises an opcode to indicate whether a dirty instance of the one or more cache lines in the first cache is to be stored to a second cache shared by the plurality of hardware processor cores instead of to the system memory.

14. The method of claim 13, wherein the range indicator comprises a second memory address, the contiguous region to span from the first memory address to the second memory address.

15. The method of claim 13, wherein the range indicator comprises an indication of a number of bytes or cache lines to be included in the contiguous region, the included cache lines having address equal to or incrementally larger than the first memory address.

16. The method of claim 13, wherein the first memory addresses is a linear memory address.

* * * * *